United States Patent
Pedersen et al.

(10) Patent No.: US 9,784,840 B2
(45) Date of Patent: Oct. 10, 2017

(54) MULTIPLE DIRECTIONAL LIDAR SYSTEM

(71) Applicant: Windar Photonics A/S, Taastrup (DK)

(72) Inventors: Christian Pedersen, Roskilde (DK); Peter John Rodrigo, Hvidovre (DK); Theis Faber Quist Iversen, Vanløse (DK)

(73) Assignee: Windar Photonics A/S (DK)

( * ) Notice: Subject to any disclaimer, the term of this patent is extended or adjusted under 35 U.S.C. 154(b) by 240 days.

(21) Appl. No.: 14/386,961

(22) PCT Filed: Mar. 25, 2013

(86) PCT No.: PCT/DK2013/050086
§ 371 (c)(1),
(2) Date: Sep. 22, 2014

(87) PCT Pub. No.: WO2013/139347
PCT Pub. Date: Sep. 26, 2013

(65) Prior Publication Data
US 2015/0055115 A1 Feb. 26, 2015

Related U.S. Application Data

(60) Provisional application No. 61/638,014, filed on Apr. 25, 2012.

(30) Foreign Application Priority Data

Mar. 23, 2012 (DK) .................................. 2012 70141

(51) Int. Cl.
*G01C 3/08* (2006.01)
*G01S 17/95* (2006.01)
(Continued)

(52) U.S. Cl.
CPC ............ *G01S 17/95* (2013.01); *G01S 7/4818* (2013.01); *G01S 7/499* (2013.01); *G01S 17/58* (2013.01); *G02F 1/093* (2013.01)

(58) Field of Classification Search
CPC .......... G01S 17/95; G01S 17/58; G01S 7/499; G01S 7/4818; G02F 1/093
(Continued)

(56) References Cited

U.S. PATENT DOCUMENTS 7,457,493 B1 * 11/2008 Li ........................ G02B 27/283
385/16
2008/0137058 A1 * 6/2008 Cesare .................... G01S 17/95
356/4.01

(Continued)

FOREIGN PATENT DOCUMENTS

WO WO 2003/048804 6/2003
WO WO 2009/046717 4/2009
(Continued)

OTHER PUBLICATIONS

International Searching Authority, European Patent Office, International Search Report for International Application No. PCT/DK2013/050086, mailed Sep. 12, 2013, together with the Written Opinion of the International Searching Authority, 15 pages.
(Continued)

*Primary Examiner* — Mark Hellner
(74) *Attorney, Agent, or Firm* — Sunstein Kann Murphy & Timbers LLP

(57) ABSTRACT

The present invention relates to a low-cost LIDAR system. The system may be integrated in a wind turbine for measurement of the approaching wind field. One embodiment relates to a LIDAR system comprising a beam generating section adapted for generating a substantially linearly polarized output beam, and a beam steering section comprising a
(Continued)

first optical device for controllably altering the polarization of the output beam, said first optical device in optical connection with a first polarizing beam splitter, said beam steering section adapted for directing the outputbeam interchangeably between a first direction and a second direction.

25 Claims, 8 Drawing Sheets

(51) Int. Cl.
G01S 7/481 (2006.01)
G01S 7/499 (2006.01)
G01S 17/58 (2006.01)
G02F 1/09 (2006.01)

(58) Field of Classification Search
USPC .............................................. 356/4.01, 28.5
See application file for complete search history.

(56) References Cited

U.S. PATENT DOCUMENTS

| 2009/0128798 A1* | 5/2009 | Danziger | G01C 3/08 356/5.01 |
| 2011/0141471 A1 | 6/2011 | Schlotterbeck et al. | 356/342 |
| 2012/0050750 A1 | 3/2012 | Hays et al. | 356/519 |

FOREIGN PATENT DOCUMENTS

| WO | WO 2011/014743 | 2/2011 |
| WO | WO 2012/019871 | 2/2012 |
| WO | WO 2013/139347 | 9/2013 |

OTHER PUBLICATIONS

Kim, et al., Wide-angle, nonmechnical beam steering using thin liquid crystal polarization gratings, Proc. of SPIE, vol. 7093, Aug. 2008, 12 pages.

Sonnenschein, et al., Signal-to-Noise Relationships for Coaxial Systems that Heterodyne Backscatter from the Atmosphere, Applied Optics, vol. 10, No. 7, Jul. 1971, 5 pages.

* cited by examiner

MULTIPLE DIRECTIONAL LIDAR SYSTEM

The present invention relates to a low-cost LIDAR system. The system may be integrated in a wind turbine for measurement of the approaching wind field.

BACKGROUND OF INVENTION

A coherent LIDAR system is an attractive system for determination of wind speed at remote locations. The basic principle relates to the Doppler shift that backscattered light from particles such as aerosols, water droplets, dust, etc. generates when irradiated by coherent laser light. Under the assumption that the particle movements resemble the airflow closely, the measured Doppler frequency can be used for calculating of a hereto proportional wind speed.

Prohibitive factors for wide spread use of LIDAR are cost, power consumption, size, and ruggedness. Today's commercially available LIDAR systems cost roughly 200 K USD, a price level that exclude many applications to be exploited. The use of LIDAR systems at remote places, such as off-shore wind turbine parks requires operation with little or no maintenance for long periods of time as well as lower power consumption.

Previously the most expensive and complicated component in a coherent LIDAR system was the laser assembly. Due to an extremely low back scatter coefficient of the aerosols ($\sim 10^{-12}$) a refined detection scheme is required that relies heavily on high quality, high power, coherent light sources. A low cost, compact and coherent LIDAR system with low power consumption was disclosed in WO 2009/046717 employing an integrated semiconductor laser assembly. This LIDAR system is however limited to line of sight measurements prohibiting the determination of a wind field.

To be able to extent the wind speed measurement beyond the line of sight the probe beam of the LIDAR must be directed in multiple directions. This may be provided by a scanning LIDAR relying on a rotating mirror or prism assembly enabling measurement of the wind velocity in a three dimensional cone. However, having a rotating mirror on top of a wind turbine is not a rugged solution. One or more LIDARs may also be integrated in the rotating hub or on the blades of a wind turbine. Rotation of the hub and the blades ensure that the probe beam scans a cone in front of the wind turbine, but the rotating movements are not really compatible with the operating requirements of LIDAR. WO 03/048804 discloses a LIDAR system employing an optical switch for directing the probe beam in multiple directions. However, the properties of an optical switch require that an expensive laser source with long coherence length is used prohibiting the use of low-cost integrated semiconductor laser assemblies.

SUMMARY OF INVENTION

The market therefore still calls for a low-cost rugged LIDAR system that is not limited to line of sight measurements. This may be achieved by one embodiment of the present invention disclosing a LIDAR system comprising a beam generating section adapted for generating a substantially linearly polarized output beam, and a beam steering section comprising a first optical device for controllably altering the polarization of the output beam, said first optical device in optical connection with a first polarizing beam splitter, said beam steering section adapted for directing the output beam interchangeably between a first direction and a second direction.

An inherited feature of a polarizing beam splitter is that it splits an incident beam into two beams of differing linear polarization, i.e. the beam propagation direction is depending on the polarization of the incident beam. The present invention exploits this feature of a polarizing beam splitter (PBS), i.e. by controlling the polarization of the incident beam the direction of propagation can be controlled. When incorporated into a LIDAR system the direction of the output beam is thereby variable if the polarization of the beam is controllable. As the polarization of light is controllable by mechanically passive components, i.e. without moving parts, the LIDAR system according to the present invention enables a rugged, low-cost LIDAR for determination of the speed and the direction of particles moving in a measurement volume thereby enabling the real-time determination of wind fields in front of e.g. a wind turbine. WO 2012/019871 discloses a method for determining the velocity vector of particles in a measurement volume. WO 2012/019871 is hereby incorporated by reference in its entirety.

A further aspect of the invention relates to a LIDAR system comprising a beam generating section adapted for generating a substantially linearly polarized output beam, and a polarization maintaining optical waveguide for propagating the output beam in a first direction and received radiation in a second and opposite direction, and a non-reciprocal optical element where through the output beam and the received radiation propagate in opposite directions, said non-reciprocal optical element adapted for rotating the polarization of the output beam and of the received radiation. An example of such a non-reciprocal optical element is a Faraday rotator that rotates the polarization of light due to the Faraday effect. Faraday rotation is an example of non-reciprocal optical propagation. Reflecting a linearly polarized beam back through the same Faraday medium does not undo the polarization change the beam underwent in its forward pass through the medium. The non-reciprocal optical element is preferably configured such that the polarization of the output beam and the polarization of the received radiation are substantially perpendicular to each other on one side of the optical element and substantially parallel to each other on the opposite side of the optical element. This may be exploited when received radiation and/or a reference beam needs to be split out for detection purposes.

In a LIDAR system probe light is typically directed towards a measurement volume and received radiation propagates back though the system to be received by a detector. As a LIDAR system is typically operating outside, the components of the system are typically weather protected and the probe beam and the received signal is propagating through some sort of window. With changing weather conditions there is a risk of condensation on the window, which may drastically reduce the transparency of the window. This problem may quite easily be solved by having some sort of electrical heat source connected to the window to keep the window warm to avoid condensation. However, there may be situations where an electrically connected window is disadvantageous. For example when a LIDAR system is installed in a wind turbine. The probe beam must be emitted toward a measurement volume in front of the blades, i.e. preferential from the top, side or bottom of the nacelle. However, the electronically driven components of a LIDAR system would suffer if installed outside the nacelle, where lightning may frequently occur. Thus, preferably the electronically driven components of the LIDAR system, such as the beam generating section, is installed inside the nacelle whereas purely optical component which are not influenced by lightning, such as the beam steering section including the window, can be installed outside the nacelle. But with an electrically neutral beam steering section there is no power to heat the window, thus condensation may be an issue. Thus, a further aspect of the invention relates to a LIDAR system comprising a beam generating section in optical connection with a beam steering section accommodating a window where through an output beam is transmitted, the beam generating section accommodating at least one heating light source with at least a part of the optical output of the heating light source transmitted to the beam steering section through at least one optical waveguide, wherein said at least one heating light source is adapted to heat said window. Thus, the basic idea is the heating light source is adapted to heat the window by converting electromagnetic energy of the optical output of the heating light source into thermal energy in the window.

A further aspect of the invention relates to a wind turbine comprising the presently disclosed LIDAR system. In particular a wind turbine comprising the presently disclosed LIDAR system, wherein the beam generating section is fully incorporated in the nacelle, the beam steering section is at least partly located outside the nacelle and the output beam and the received radiation is transmitted between the nacelle and the outside by means of a polarization maintaining optical fibre.

A further aspect of the invention relates to a sailboat comprising the presently disclosed LIDAR system. Yet a further aspect of the invention relates to an airplane comprising the presently disclosed LIDAR system.

LIDAR Background

The basic principles of the coherent LIDAR dates more than 35 years back, c.f. "Signal-to-Noise Relationships for Coaxial Systems that Heterodyne Backscatter from the Atmosphere", Applied Optics, Vol. 10, No. 7, July 1971, C. M. Sonnenschein and F. A. Horrigan. The applications have traditionally been of scientific interest, for instance within atmosphere physics. However, nowadays the LIDAR has become more and more relevant for practical industrial applications. One such example is for the control of wind turbines. The need for higher efficiency has forced the wind turbine industry to continuously increase the wing span over the last decades in order to improve the performance in terms of extracted electrical energy per installed wind turbine. However an increased wing span leads to a substantial mechanical load imposed by strong winds and by wind turbulence in particular. A compact, rugged and cheap coherent LIDAR device for wind speed prediction tens of meters up-wind will allow for optimization and protection of the wind turbine. The time delay between the actual wind speed measurement and the time where the wind actual reached the wind turbine can be used to protect the load of the wings, for instance by changing the pitch of the wing. Another example is vortex detection generated by landing air crafts. The landing (or take off) frequency of aircrafts is primarily determined by a safety margin so as to ensure no hazard from vortexes generated by the previous aircraft. Using a coherent LIDAR for vortex surveillance allows this safety period to minimized, thus increasing the traffic intensity and thereby the capacity of the airport.

A continuous wave (CW) coherent LIDAR rely on the focusing properties of the telescope used to confine the actual probe volume. The width of the probe volume is confined by the diameter of the laser beam in the focused region (i.e. the focal beam waist). The length of the probe volume along the beam axis is confined approximately by the depth of focus or twice the Rayleigh length of the focused laser beam. For a CW LIDAR focused at a distance of one hundred meters from the CW LIDAR system, the width of the probe volume is typically in the order of one centimeter and the length of the probe volume is in the order of ten meters depending on wavelength and focusing optics (the telescope). For pulsed systems the width of the probe volume is the same as for the CW LIDAR case, but the length of the probe volume is given by the smaller of cT/2 and the depth of focus where T is the emitted pulse width and c is the speed of light.

The CW output power from the laser source used in a LIDAR system should be in the order of 1 Watt in order to obtain sufficient back scattered light to be detected. The homodyne detection technique requires firstly that the coherence length of the light source to be essentially two times the distance to probe volume, e.g. 200 meters for typical wind turbine applications. This corresponds to a full width half minimum (FWHM) of the laser spectrum of only a few 100 kHz relative to a centre frequency of about 200 THz. Secondly, the spatial coherence of the laser beam should be close to that of an ideal Gaussian beam, so as to ensure the generation of a maximum beat signal from the quadratic detector. The beat signal is characterized by the frequency difference between the reference signal and the back scattered—and Doppler shifted—signal. Finally, the relative intensity noise (RIN) of the laser should be sufficiently low to discriminate the beat signal at the detector. WO 2009/046717 describes how to obtain these qualities by means of an integrated semiconductor laser assembly. WO 2009/046717 is therefore incorporated by reference in its entirety.

Although the term heterodyne detection is often used in connection with optical interferometry, the term homodyne detection is used throughout the present disclosure to signify that the reference beam (the local oscillator) is derived from the same source as the signal beam before the modulating process, i.e. the scattering by the target.

DESCRIPTION OF DRAWINGS

The invention will now be described in more detail with reference to the drawings in which.

DETAILED DESCRIPTION OF THE INVENTION

In one embodiment of the invention the LIDAR system is a coherent Doppler LIDAR system.

Figure 4:
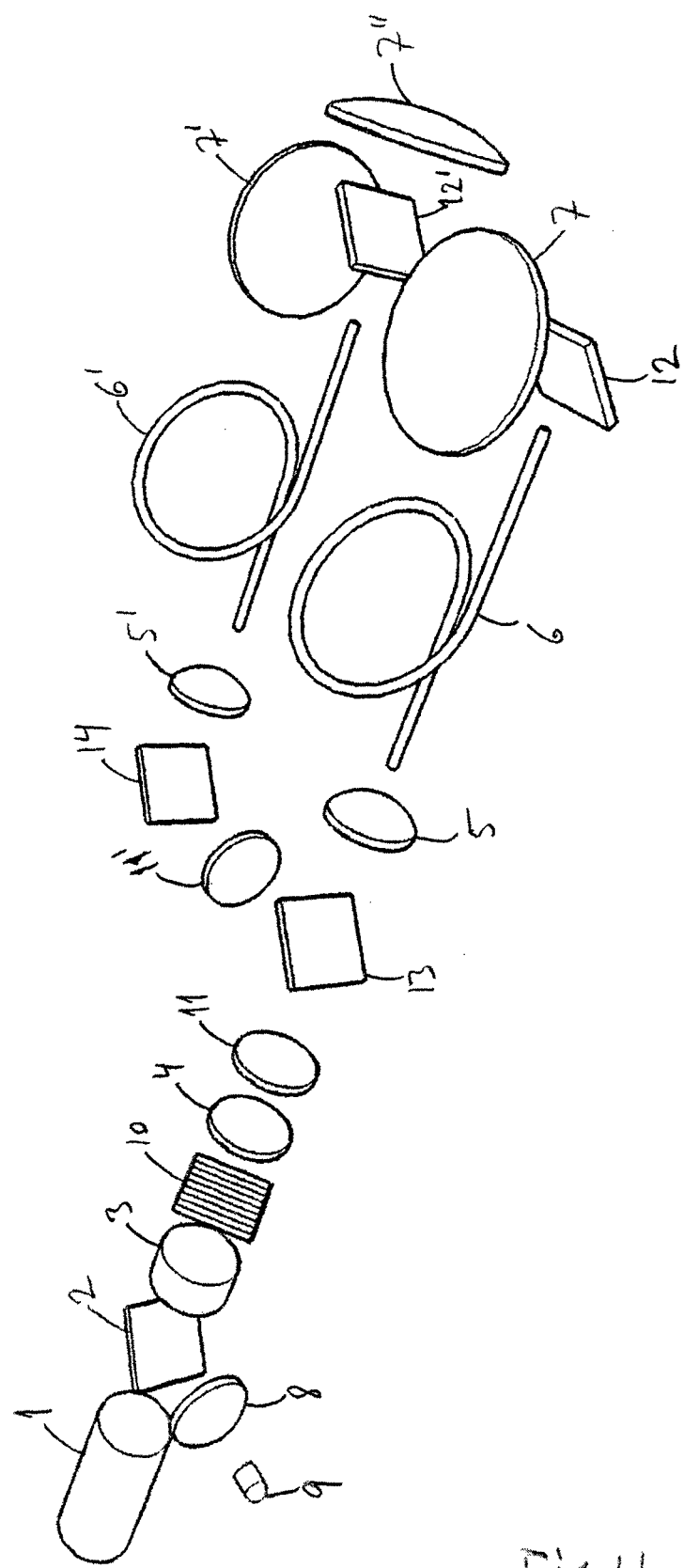
FIG. 4 is a perspective illustration of multidirectional LIDAR system according to the invention where the output beam is directed in three different directions.

The basic configuration of the present LIDAR system is directing the output beam into two directions; the first and the second direction. However, the principle may be multiplied by adding more polarization controlling optical devices and more PBS's. Thus, in a further embodiment of the invention the beam steering section further comprises a second optical device for controllably altering the polarization of the output beam propagating in the second direction, said second optical device in optical connection with a second polarizing beam splitter, said beam steering section adapted for directing the output beam interchangeably between the first direction, the second direction and a third direction. With three directions the output beam can be directed at a 3D measurement volume. However, more output beam directions, e.g. a fourth, fifth, sixth, seventh, eighth, ninth and tenth direction, may be added. Each additional pair of polarization controlling device and PBS can provide one or two new directions. This principle of adding more directions is illustrated in FIG. 4.

In a LIDAR system the beam steering section is typically adapted for directing the output beam towards a measurement volume for illumination of particles in the measurement volume. The system may further comprise a lens arrangement for focusing the output beam onto a measurement volume. The target may be any object capable of interacting with light incident upon it resulting in scattering, absorption and/or emission of light from the target. The target in the measurement volume may for example be aerosols, such as water droplets, dust, etc., particles, molecules, atoms, a surface of an object larger than the width of the measurement volume, etc. throughout the present disclosure, the term "particles" includes aerosols, molecules, atoms, etc.

A LIDAR system also typically comprises means for generating a reference beam. Preferably the reference beam is propagating at least coaxially with, and in the same direction as, the received signal beam and possibly also in the opposite direction of the output beam The reference beam may at least partly be generated by a partly reflecting mirror. The reference beam may alternatively at least partly be generated by the first or second end surface of an optical fiber.

In the preferred embodiment of the invention the LIDAR system is adapted for detecting, propagating and/or receiving radiation received from said first, second and/or third direction. The received radiation may e.g. comprise light emitted from particles in the measurement volume illuminated by the output beam. The received radiation is preferably propagating in the opposite direction of the output beam. The LIDAR system may further comprise a detector adapted for detection of a reference beam mixed with received radiation. In the preferred embodiment of the invention the polarization of the reference beam is substantially equal to the polarization of the received radiation.

In the preferred embodiment of the invention the LIDAR system further comprises an initial polarizing beam splitter adapted for splitting out a reference beam and received radiation, both propagating in the opposite direction of the output beam.

In one embodiment of the invention the first and/or the second optical device may function as reciprocal polarization altering optical device. When a polarized beam is reflected back through the same reciprocal polarization altering optical device the polarization change the beam underwent in its forward pass through the device, may be undone depending on the polarization state of the beam and the configuration of the polarization altering optical device. A variable optical retarder can function as a reciprocal polarization altering optical device, at least in the case where the beam is linearly polarized. In one embodiment of the invention the first and/or the second optical device is a variable optical retarder. A wave plate is an example of an optical retarder and a rotatable wave plate is an example of a variable optical retarder. When applying a linearly polarized beam to e.g. a half-waveplate, it emerges as a linearly polarized beam but its polarization (plane) is rotated with respect to the polarization (plane) of the incident beam. Thus, used in conjunction with a PBS the output beam may be directed in two different directions by rotating the wave plate correspondingly.

Another example of a variable optical retarder is a liquid crystal variable optical retarder which consists of a transparent cell filled with a solution of liquid crystal molecules. Two parallel faces of the cell wall are coated with a transparent conductive film so that a voltage can be applied across the cell. The orientation of the liquid crystal molecules is determined by the alignment layer in the absence of an applied voltage. When an AC voltage is applied, the molecules will change from their default orientation based on the applied rms value of the voltage. Hence, the phase offset in a linearly polarized beam of light can be actively controlled by varying the applied voltage, i.e. by varying the applied voltage the polarization of an incident linearly polarized beam can be controllably rotated. A major advantage of this variable optical retarder is that there are no moving parts. Thus, in a further embodiment of the invention the first and/or the second optical device is adapted for controllably altering the polarization of the output beam without moving parts. Preferably the first and/or the second optical device is adapted for controllably altering the polarization of the output beam between two specific states of polarization, preferably with a predefined frequency. A variable optical retarder may also be integrated in an optical fiber, where the phase offset in a linearly polarized beam propagating through this fiber can be controlled by e.g. piezo-electric elements in contact with the optical fiber. The advantage of such a solution is that a greater part of the optical path of the LIDAR system can be kept propagating inside an optical fiber.

Said frequency may be approx. 1 Hz, such as between 0.01 Hz and 1 kHz, such as between 0.01 Hz and 0.1 Hz, such as between 0.1 Hz and 0.2 Hz, such as between 0.2 Hz and 0.3 Hz, such as between 0.3 Hz and 0.4 Hz, such as between 0.4 Hz and 0.5 Hz, such as between 0.5 Hz and 0.6 Hz, such as between 0.6 Hz and 0.7 Hz, such as between 0.7 Hz and 0.8 Hz, such as between 0.8 Hz and 0.9 Hz, such as between 0.9 Hz and 1 Hz, such as between 1 Hz and 1.5 Hz, such as between 1.5 Hz and 2 Hz, such as between 2 Hz and 3 Hz, such as between 3 Hz and 4 Hz, such as between 4 Hz and 5 Hz, such as between 5 Hz and 6 Hz, such as between 6 Hz and 7 Hz, such as between 7 Hz and 8 Hz, such as between 8 Hz and 9 Hz, such as between 9 Hz and 10 Hz, such as between 10 Hz and 15 Hz, such as between 15 Hz and 30 Hz, such as between 30 Hz and 60 Hz, such as between 60 Hz and 100 Hz, such as between 100 Hz and 1 kHz.

In one embodiment of the invention the optical connection between the first optical device and the first polarizing beam splitter is at least partly provided by a polarization maintaining optical waveguide. In a further embodiment the optical connection between the first optical device and the first polarizing beam splitter is at least partly provided by an optical fiber, preferably a polarization maintaining optical fiber, such as a Panda type PM fiber. Likewise for the connection between possible second, third, etc. optical devices and second, third, etc. PBS's. The LIDAR system may further comprise means for aligning the polarization of the output beam to the propagation direction of the polarization maintaining optical waveguide/fibre.

In one embodiment of the invention the beam generating section further comprises one or more polarizers, preferably absorptive polarizers, such as one or more linear polarizers, such as one or more 45 degree linear polarizers, located in the optical path. This may help to ensure that any unwanted polarization states in the optical path are absorbed.

In one embodiment of the invention the beam generating section further comprises a non-reciprocal optical element where through the output beam and the received radiation propagate in opposite directions, said non-reciprocal optical element adapted for rotating the polarization of the output beam and of the received radiation. An example of such a non-reciprocal optical element is a Faraday rotator that rotates the polarization of light due to the Faraday effect. Reflecting a polarized beam back through the same Faraday medium does not undo the polarization change the beam underwent in its forward pass through the medium. The non-reciprocal optical element is preferably configured such that the polarization of the output beam and the polarization of the received radiation are substantially perpendicular to each other on one side of the non-reciprocal optical element and substantially parallel to each other on the opposite side of the non-reciprocal optical element. A further advantage of the non-reciprocal optical element is that is allows sufficient suppression of stray light to enable the use of a low-cost semi-conductor laser with limited coherence time as the light source. The non-reciprocal optical element may further be adapted to rotate the polarization of the output beam by approx. 45 degrees when the output beam propagates through said non-reciprocal optical element. Likewise the non-reciprocal optical element may be adapted to rotate the polarization of the received radiation by approx. 45 degrees when the received radiation propagates through said non-reciprocal optical element. And further the non-reciprocal optical element may be adapted to rotate the polarization of the reference beam by approx. 45 degrees when the reference beam propagates through said non-reciprocal optical element. An advantage of having a non-reciprocal optical element, e.g. in the form of the Faraday rotator, is that a large part of the LIDAR may be allowed to propagate along a single optical axis.

In one embodiment of the invention the beam generating section comprises a coherent light source, such as a coherent laser, such as a semiconductor laser, such as an integrated semiconductor laser assembly, which may be a cost effective solution. Preferably the beam generating section comprises a coherent light source delivering a collimated linearly polarized output.

Measurement of the Doppler shift of the back scattered signal from the measurement volume can be used for determination of the velocity of the particles. Thus, in a further embodiment of the invention the LIDAR system may further comprise a signal processor. The signal processor may be adapted for generating a velocity signal corresponding to the velocity of the particles based on the detector signal. The signal processor may further be configured for determination of wind velocity, turbulence in the measurement volume, temperature in the measurement volume and/or particle concentration in the measurement volume. The amplitude of the backscattered Doppler shifted signal may be used for determination of the concentration of particles in the measurement volume. Thus, the signal processor may further be configured for generating a concentration signal corresponding to the concentration of the particles in the measurement volume based on the detector signal.

In absence of a particle flow, i.e. the velocity is zero or very low, the Doppler frequency will be zero and the amplitude will be difficult to extract due to other DC signals coming from the detection process. One way to overcome this may be to include a frequency shifting element, e.g. an acousto-optic modulator, in the system for frequency shifting the output beam and/or the reference beam. Thereby a frequency bias may be added to the received signals corresponding to the frequency shift induced by the frequency shifting element.

The detector signal output by a detector may e.g. contain the difference frequency of the reference beam and light emitted from the target corresponding to the Doppler shift generated by movement of the target in the measurement volume. In case of wind speed measurements, e.g. based on aerosols suspended in the air and following wind movements, turbulence information can be extracted.

In case the medium residing in the measurement volume is a gas, Rayleigh scattering can be probed. Rayleigh scattering originates from the elastic interaction between the excitation light beam and the molecules of the gas. In that case the width of the Doppler spectrum corresponds to the temperature of the gas. Therefore, temperatures of gasses can be measured at long distances. It should be noted that compared to back scattered signals from aerosols, Rayleigh scattered signals are usually orders of magnitude smaller and depends strongly on the specific gas component and the excitation wavelength (Rayleigh scattering is a function of wavelength to the power of minus 4). Special gas components of interest could be oxygen, nitrogen, carbondioxide and NOx gasses.

As stated above a further aspect of the invention relates to a LIDAR system comprising a beam generating section in optical connection with a beam steering section accommodating a window where through an output beam is transmitted, the beam generating section accommodating at least one heating light source with at least a part of the optical output of the heating light source transmitted to the beam steering section through at least one optical waveguide, wherein said at least one heating light source is adapted to heat said window.

Preferably said at least one heating light source is adapted to heat said window by converting electromagnetic energy of the optical output of the heating light source into thermal energy in the window. For example said at least one heating light source may be adapted to avoid condensation of at least a part of the window, i.e. a defogging system using only optical power as the source of heat. Preferably the optical waveguide comprises one or more optical fibres. The wavelength of the output beam is preferably different from the wavelength of the heating light source. The LIDAR system is typically provided with a detector that operates or is sensitive in a certain wavelength interval. Thus, preferably the wavelength of the heating light source is different from the detection wavelength interval of the LIDAR system. E.g. an InGaAs based detector is sensitive in a wavelength interval of approx. 800-1700 nm and the wavelength of the heating light source should then be selected outside of this range, e.g. above 1700 nm where eye-safety is not an issue. The wavelength of the heating light source may further be selected to be in the range of the absorption spectra of typical impurities in glass, such as OH absorption.

The window may be a "normal" optical transparent window or it may be a lens in the LIDAR system, e.g. a lens adapted for focusing the output beam. The window is preferably elliptic, such as circular. The window is preferably provided with a first and a second surface. One or both surfaces of the window may be provided with antireflective coating.

In the preferred embodiment of the invention light from the heating light source is coupled in between the two surfaces of the window. The light from the heating light source can then propagate inside the window by means of total internal reflection between the two surfaces of the window. During this propagation the optical power is at least partly converted to heat in the window due to e.g. absorption due to impurities in the window. If the glass is of a high optical quality the presence of impurities may be low, but as the light propagates inside the window due to internal reflections from all surfaces the light does not easily exit ensuring that the beam path is relatively long, thereby ensuring a certain degree of absorption of the light. The window material may further be doped with one or more elements that absorb light from the heating light source, to increase the conversion of optical power to heat dissipated in the window.

Light from the heating light source may be coupled in between the two surfaces of the window by means of refractive element, such as a coupling facet, prism or light-pipe. The refractive element is preferably concave, such that the light is distributed into the window over a wider exit angle. To prevent that light exits through the circumferential border of the window, this border may be provided with a metallic and/or reflective coating. The circumferential border may also be provided with some sort of rim where the inside of the rim is reflective, e.g. a metallic mounting rim, possibly a coated rim. Thus, light can be reflected back into the window and heat may be dissipated in the border/rim thereby helping to heat the window.

The beam generating section may be physically separated from the beam steering section. Further, the beam generating section may be electrically separated from the beam steering section. And further the beam steering section may be electrically neutral. This aspect of the invention may further comprise any of the herein stated LIDAR system features.

DETAILED DESCRIPTION OF DRAWINGS

Figure 1:
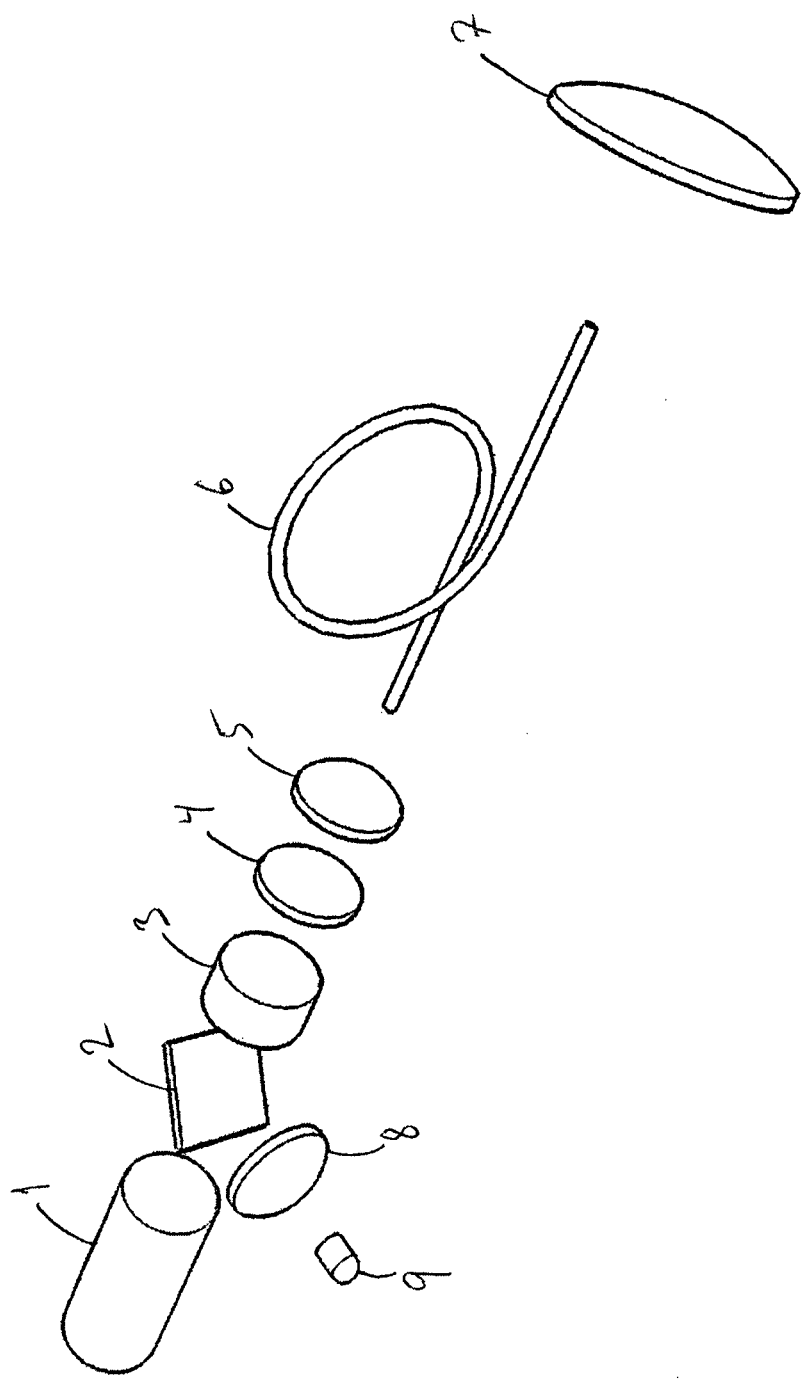
FIG. 1 is a perspective illustration of LIDAR system according to the invention.

FIG. 1 schematically illustrates a uni-directional LIDAR system according to the invention with a non-reciprocal element in the form of a Faraday rotator 3. A semiconductor laser assembly 1 provides a linearly polarized output beam that is fully transmitted through the polarizing beam splitter (PBS) 2. The Faraday rotator 3 rotates the polarization of the output beam by approx. 45 degrees. The partly reflecting mirror 4 is coated to back-reflect a certain percentage of the output beam. The back reflected beam, i.e. the reference beam, is transmitted back through the Faraday rotator, i.e. in the opposite direction of the output. The polarization of the reference is now rotated an additional 45 degrees by the Faraday rotator due to the non-reciprocal propagation properties of the Faraday rotator. The result is that the polarization of the reference beam when incident on the initial PBS 2 is perpendicular to the polarization of the output beam and the reference beam is therefore fully reflected by the surface of the PBS 2. The reference beam is focused by the lens 8 onto the detector 9.

The main percentage of the laser optical output, i.e. the output beam, is transmitted as linear polarized light through the reference window 4 and focused in to the polarization maintaining optical fiber 6 by means of the focusing lens 5. The output beam is then focused onto the measurement volume (not shown) by means of the telescope lens 7. The focus distance of the telescope sets the measurement distance for the system. Particles or aerosols in the measurement volume have a velocity component directed along the propagation path of the transmitted output beam. A back-scattered and Doppler shifted signal beam from the measurement volume is received by the same lens 7 also used in the transmitter part and transmitted back through the optical fiber 6, the lens 5 and the reference window 4. The polarization of the received radiation has been preserved all the way but when propagating through the Faraday rotator 3 the polarization of the received radiation is rotated an additional 45 degrees. The polarization of the received radiation is aligned with the polarization of the reference beam. The initial polarizing beam splitter 3 then fully reflects the received radiation to precisely align with and following the reference beam through the focusing lens 8 which focus both beams onto the detector 9. The surface of the detector may be slightly tilted to avoid any back reflections to propagate back in the optical path of the system.

The received radiation and the reference beam form a time evolving optical interference signal on the detector surface which, together with the detection process at the detector, forms a homodyne detection of the Doppler frequency of the received radiation. The detection means converts the optical signal into an electrical Doppler signal. The electrical Doppler signal from the detector 9 can be further amplified and Fourier analysed by a signal processor (not shown)

Only a single semiconductor laser is necessary for generating the sufficient optical power needed to detect a Doppler signal. The combination of the PBS 2 and the Faraday rotator 6 acts as beam director to direct all the optical power from the reference beam and the received radiation towards the detector 9. Also, the same combination of the polarizing beam splitter 2 and the Faraday rotator 4 acts as an optical isolator which prevents any returning optical power to propagate towards the laser 1.

Figure 2:
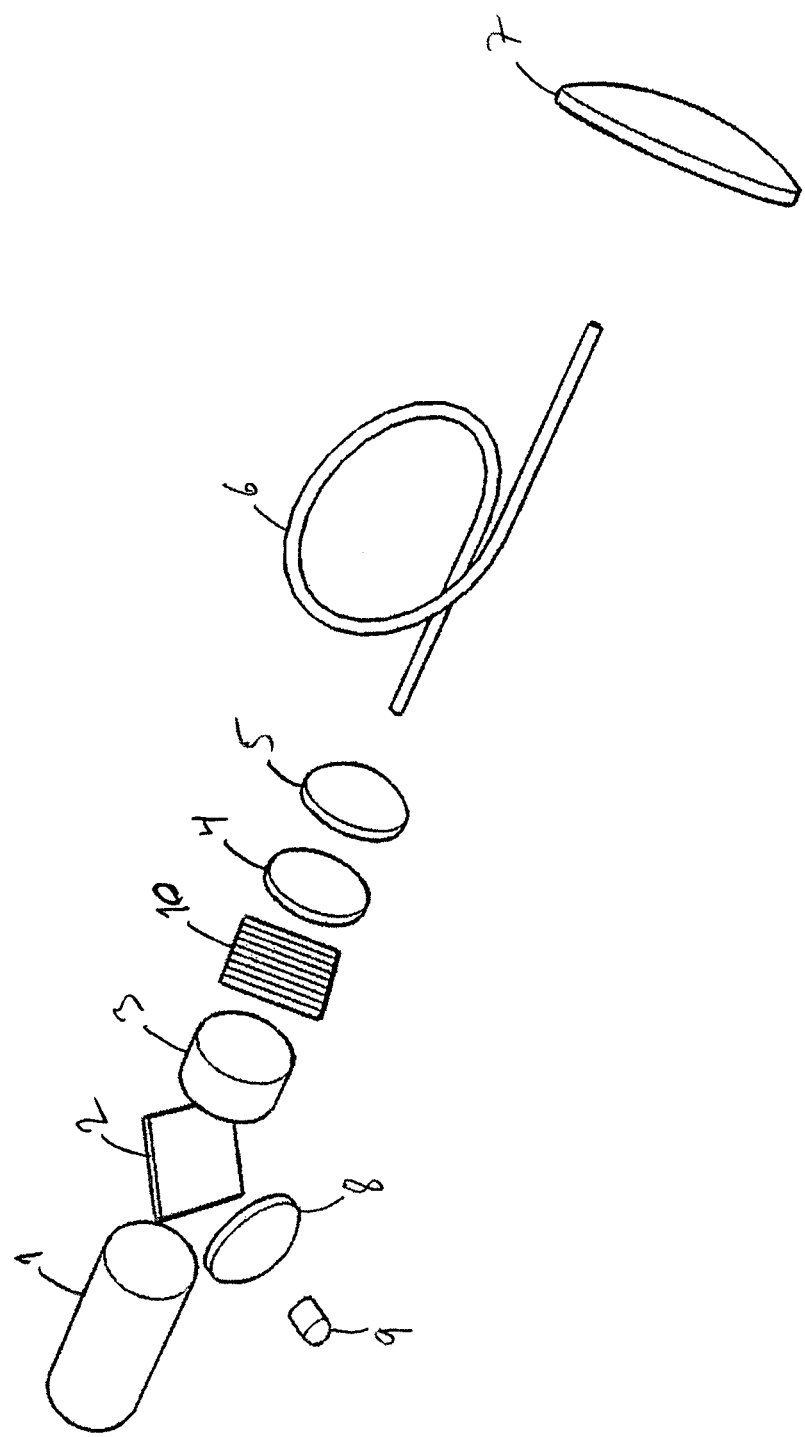
FIG. 2 is the system from FIG. 1 with the addition of a linear polarizer.

FIG. 2 corresponds to the setup in FIG. 1 with an additional linear polarizer 10 to ensure that any unwanted polarization states in the optical path are absorbed. Please note that the linear polarizer will remove unwanted polarization states from the output beam propagating in one direction and from the received radiation and the reference beam propagating in the opposite direction. In FIG. 2 the linear polarizer is located in the optical path between the Faraday rotator and the mirror 4, but it may be located anywhere in the optical path and several linear polarizers may be placed in the optical path. In FIG. 2 the linear polarizer is illustrated with the wire-grid oriented at approx. 45 degrees to illustrate that the Faraday rotator has rotated the polarization of the output beam approx. 45 degrees.

Figure 3:
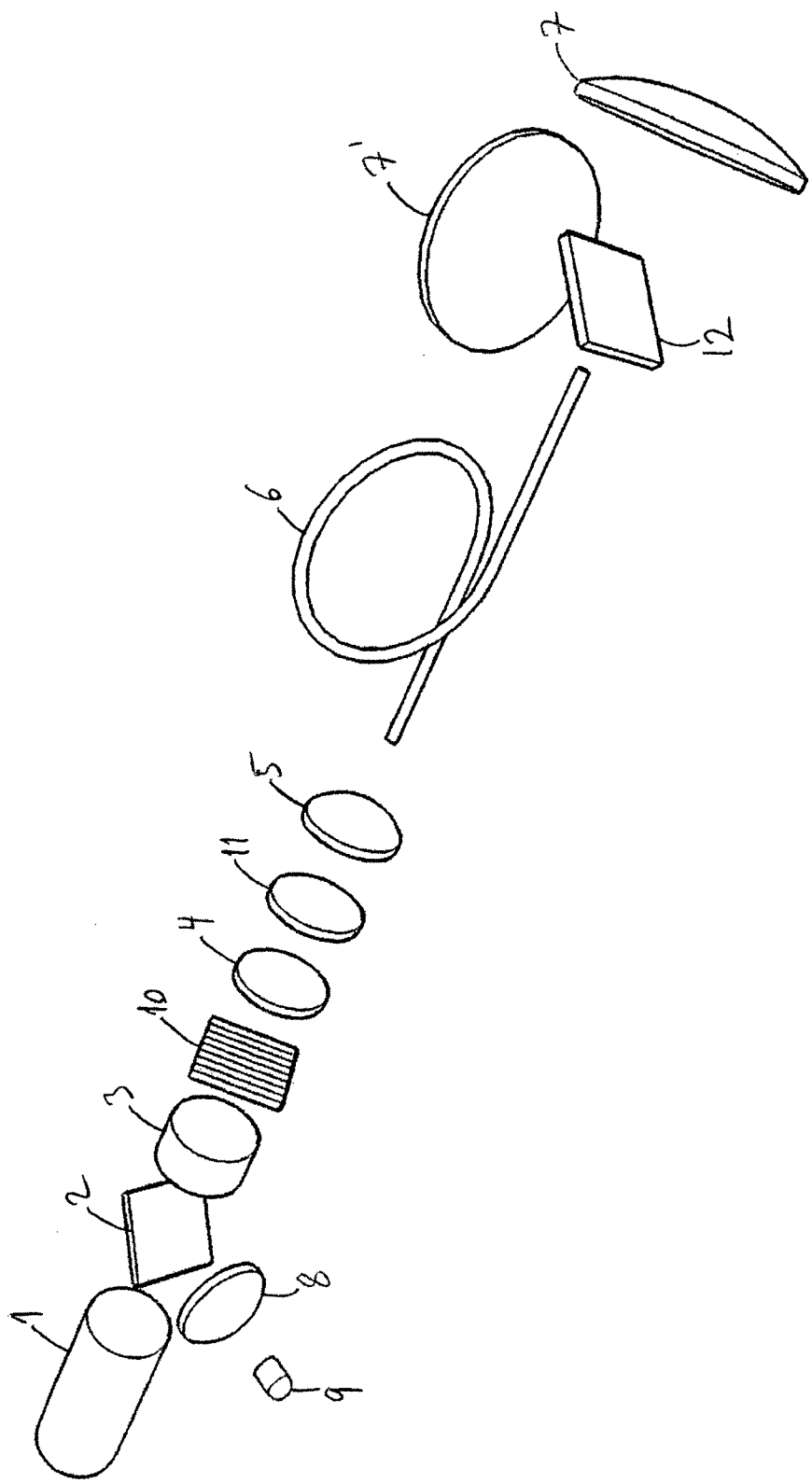
FIG. 3 is a perspective illustration of multidirectional LIDAR system according to the invention where the output beam is directed in two different directions.

FIG. 3 shows a perspective illustration of a multi-directional LIDAR system according to the invention. Compared to the system illustrated in FIG. 2 a variable optical retarder 11, a PBS 12 and an additional lens 7' have been inserted in the optical path. The optical retarder 11 may be a rotatable wave plate, wherein the polarization of the output beam is rotated with respect to the angle of the waveplate, or a liquid crystal based optical retarder, where the polarization of the output beam is rotated when a voltage is applied across the retarder. Used in conjunction with the PBS 12 the variable optical retarder can select whether the output beam is transmitted through the PBS 12 and through the lens 7 or reflected on the PBS and continuing through the lens 7'.

Thus, the LIDAR system is directing the output beam in two directions by controlling the polarization of the light via the variable optical retarder 11.

This principle can be generalized as illustrated in FIG. 4. By inserting an additional PBS 13 and an additional variable optical retarder 11' in the optical path more directions of the output beam can be selected. The first variable optical retarder 11 toggles the polarization between two states such that the output beam propagates 1) through PBS 13, through lens 5, into PM optical fiber 6, reflected off PBS 12 and continuing through lens 7, which is a first direction of the output beam, or the output beam is
2) reflected off PBS 13 and through the second variable optical retarder 11'.

This second variable optical retarder 11' can again toggle the polarization between two states and in conjunction with the second PBS 12' select the second direction of the output beam through lens 7' and the third direction of the output beam through lens 7''. A fourth direction of the output beam can be provided by placing a third variable optical retarder between PBS 13 and lens 5 to work in conjunction with PBS 12. An additional lens 7''' (not shown) would also be needed.

Figure 5:
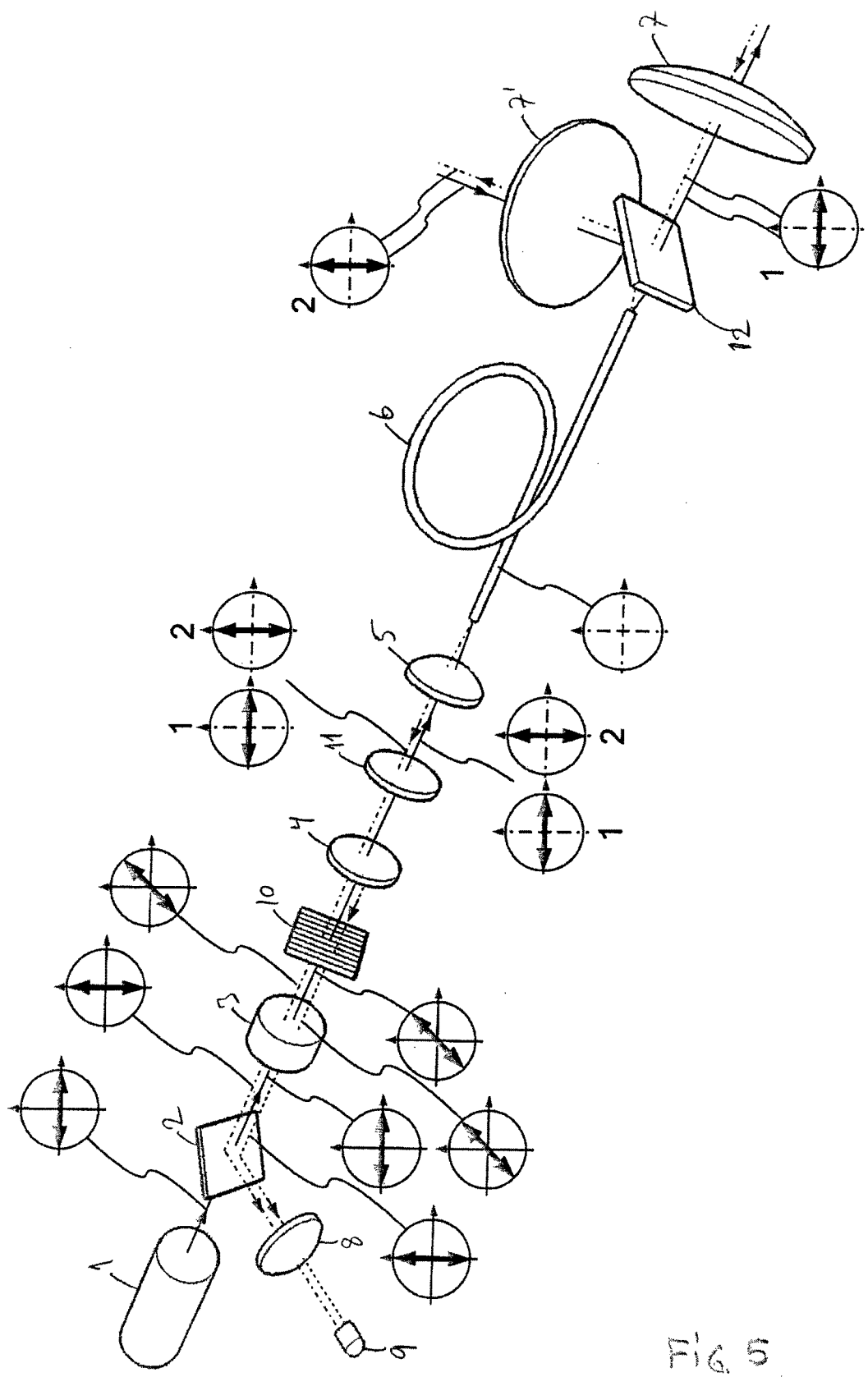
FIG. 5 is the system from FIG. 3 with indication of polarization states.

FIG. 5 is a "functional" illustration of the setup in FIG. 3 where the states of the polarization are indicated. The axes of polarization shown in FIG. 5 are arbitrarily selected for illustrative purposes and illustrated via the inserted pictograms, as also illustrated to the right here. The output beam is illustrated with a fully drawn line whereas the reference beam and the received radiation are illustrated with dotted lines. The propagation directions of the beams are indicated with arrows. To distinguish the reference beam from the received radiation: The reference beam is reflected from the reference beam generator 4.

First we follow the output beam emitted from the light source 1: The output beam is emitted from the laser 1 as linearly polarized light, here illustrated as oscillating in the horizontal plane via the pictogram. After passage through the PBS 2 the polarization of the output beam is oscillating in the horizontal plane. When the output beam propagates through the Faraday rotator 3 the polarization of the output beam is rotated approx. 45 degrees to the right, as illustrated by the corresponding pictogram. The Faraday rotator could also have been adapted to rotate the polarization approx. 45 degrees to the left. The linear polarizer 10 and the mirror 4 do not change the polarization of the output beam. The variable optical retarder 11 switches the polarization of the output beam between the two orthogonal states "1" and "2" as illustrated by the pictograms. The PM fiber 6 transmits both states "1" and "2" without affecting the polarization. The "1" state is transmitted through the PBS 12 and through the lens 7 into a first direction of the output beam. The orthogonal "2" states is reflected off the PBS 12 and through the lens 7' into a second direction of the output beam.

The radiation received from the measurement volume has the same polarization as the output beam as illustrated in the pictograms adjacent to the lenses 7, 7'. The received radiation propagates back through the optical fiber and through the variable optical retarder 11. The retarder is not a non-reciprocal optical element. In this case the two orthogonal states "1" and "2" of the received radiation, oscillating in the horizontal and vertical plane, respectively, will be reversed back to the 45 degrees polarization state. When the received radiation propagates through the non-reciprocal Faraday rotator the polarization of the received radiation will be rotated an additional 45 degrees thereby oscillating in the vertical plane, as illustrated in the corresponding pictogram. The received radiation will therefore be reflected off the initial PBS 2 and into the detector.

Likewise with the reference beam which is generated by the mirror 4. This reflection maintains the 45 degrees polarization. When the reference beam propagates through the non-reciprocal Faraday rotator the polarization of the reference beam will be rotated an additional 45 degrees thereby oscillating in the vertical plane, as illustrated in the corresponding pictogram. The reference beam will therefore be reflected off the initial PBS 2 and into the detector.

From FIG. 5 it is seen that on one side of the Faraday rotator the polarization of the output beam, the received radiation and the reference beam is aligned, whereas on the opposite side of the Faraday rotator the polarization of the output beam is perpendicular to the polarization of the received radiation and the reference beam.

From the drawings it can be seen that after the optical fiber the components are purely optical, whereas before the optical fiber there are electrically and/or mechanically driven components, such as the light source 1, the detector 9, the Faraday rotator 3 and the variable optical retarder 11. Thus, when integrating the present LIDAR system in a wind turbine the electrically and/or mechanically driven components can be integrated inside the nacelle whereas the purely optical components such as PBS and lenses 7, 7' can be located outside the nacelle, e.g. on top of the wind turbine. The optical connection between the two sections of the LIDAR system is provided by a weather resistant optical cable comprising one or more PM optical fibers. Thus, the present invention provides a low-cost flexible LIDAR system.

Figure 7:
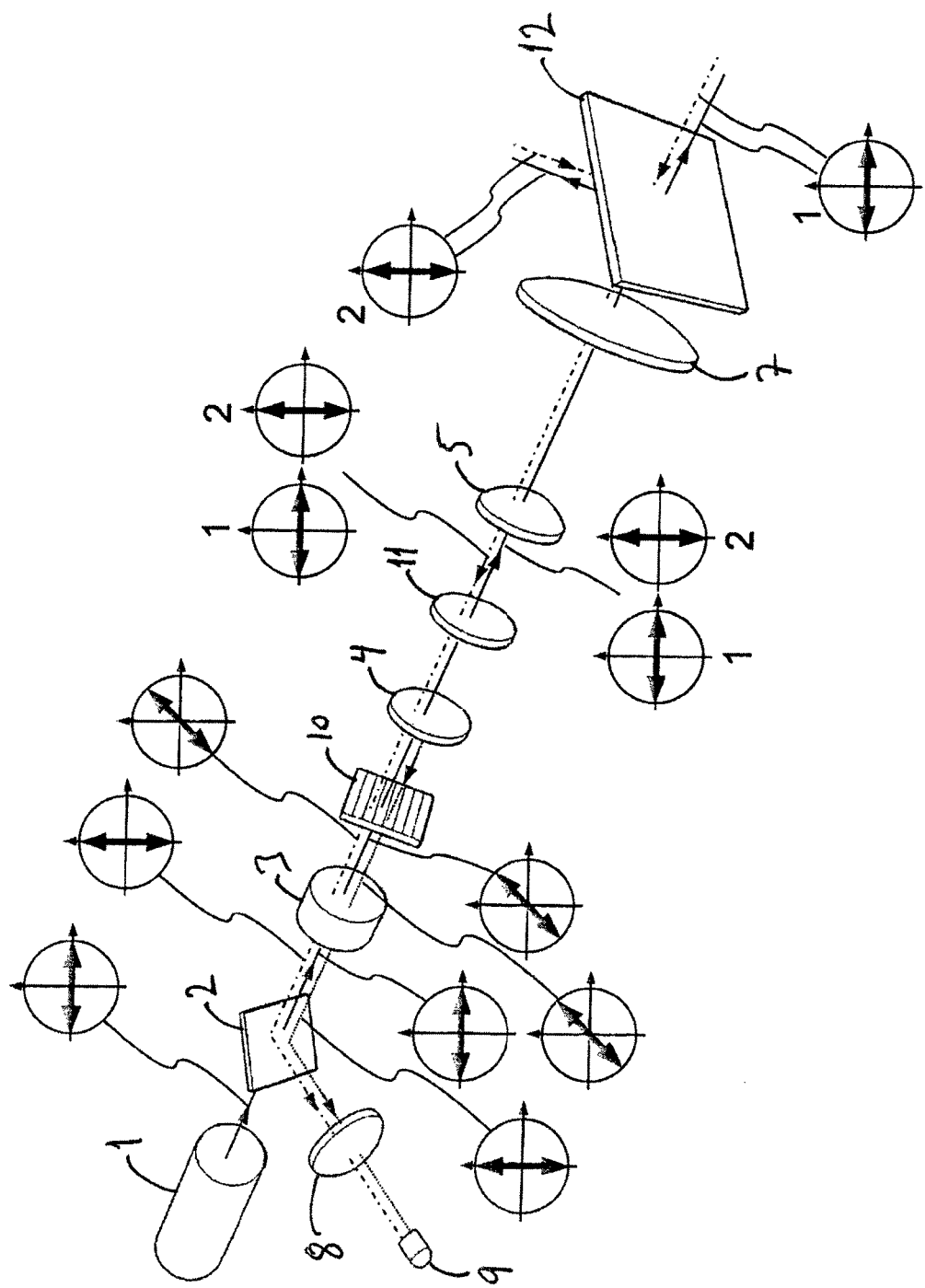
FIGS. 7 & 8 are perspective illustrations of multidirectional LIDAR systems according to the invention, without a PBS between the telescopic lenses.
Figure 8:
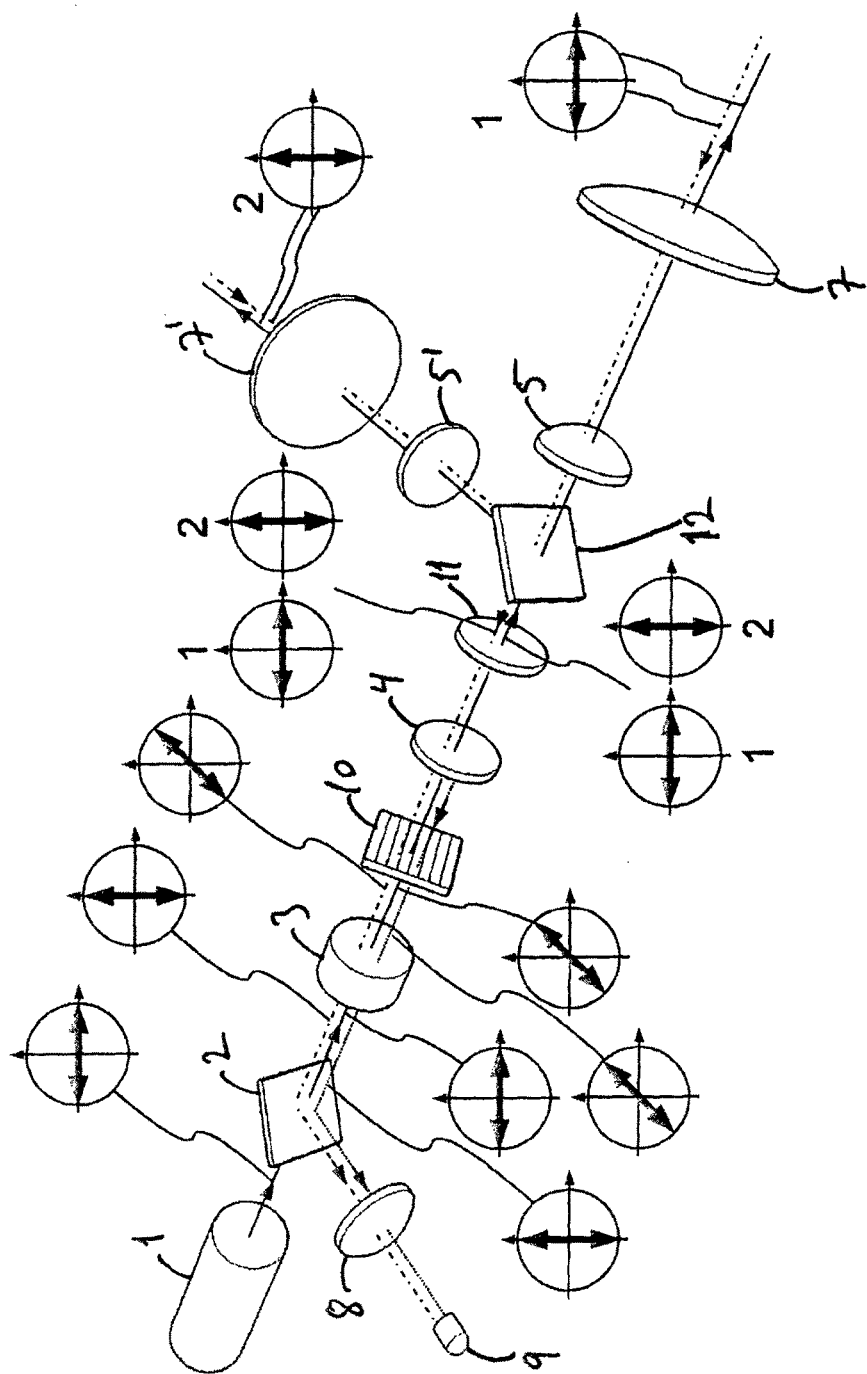

In some instances it may be disadvantageous to the focusing capability of the LIDAR to place a PBS in highly converging or highly diverging beams. FIGS. 7 and 8 show examples that address this issue. In FIG. 7 the PBS 12 is placed after the telescope lens 12, whereas in FIG. 8 the PBS is placed before the lens 5. The setup in FIG. 8 naturally requires an additional lens 5' to pair with lens 7'. Thus, in FIGS. 7 and 8 the PBS 12 is not located in the beam path between the telescopic configurations of lenses 5 and 7 (or 5' and 7'). Please note that FIGS. 7 and 8 show examples of the LIDAR system according to the present invention without an optical fibre in the beam path. Likewise FIGS. 5, 7 and 8 also show functional illustrations indicating polarization states along the optical axis.

As apparent from FIGS. 5, 7 and 8 the employment of a non-reciprocal optical element in the form of the Faraday rotator allows a large part of the LIDAR to propagate along a single optical axis, i.e. a single optical axis between the polarization beam splitters 2 and 12 in FIGS. 5, 7 and 8.

Figure 6:
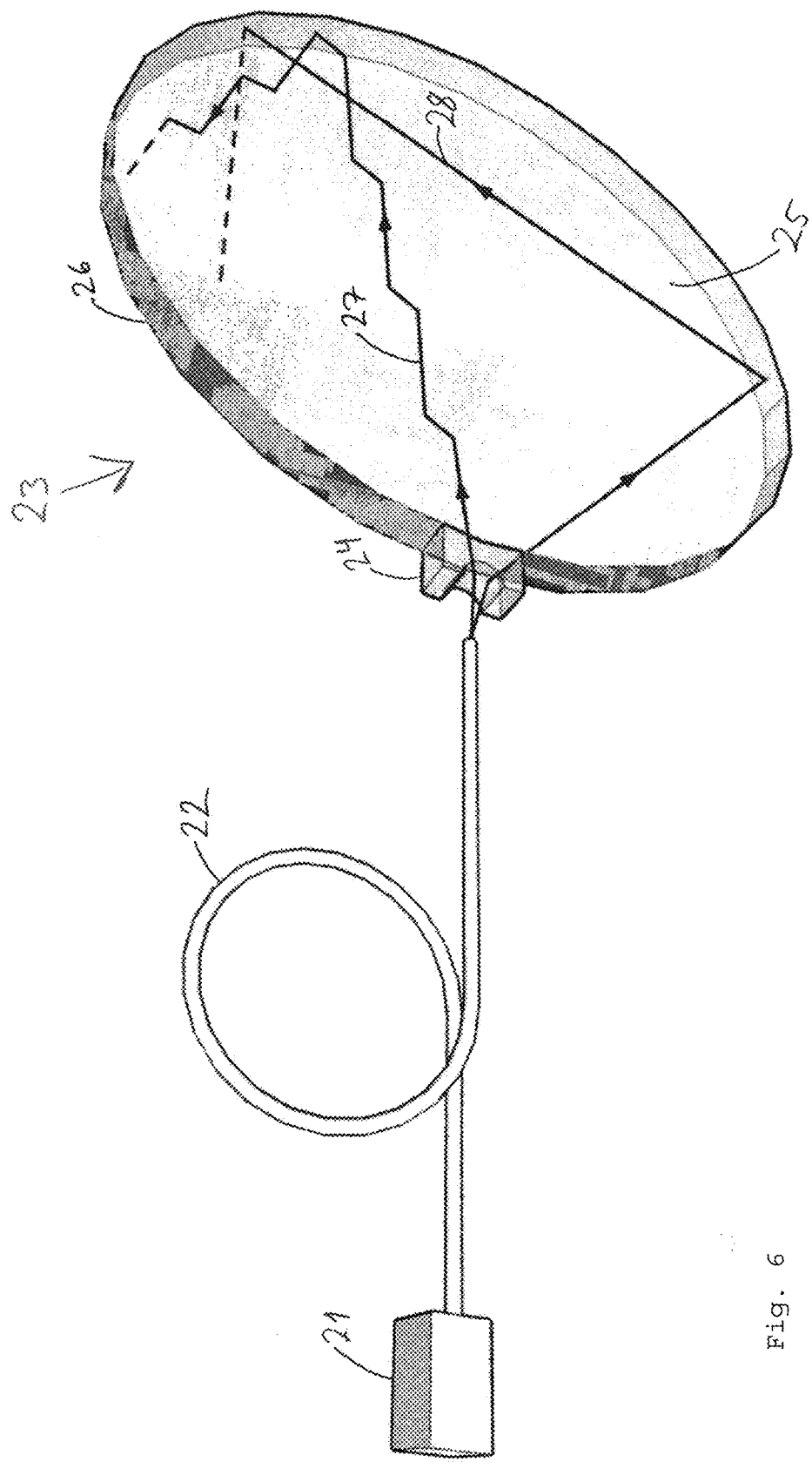
FIG. 6 is a perspective illustration of the coupling between a fibre coupled heating light source and a window/lens.

FIG. 6 relates to optical heating of the exit window of a LIDAR system, i.e. essentially a defogging and/or deicing system. The heating light source 21 is coupled into a fiber optic cable 22 connected to a refractive element 24 that distributes the light from the fiber 22 into the window 23, which can be a normal window or a lens of the LIDAR system. The circular window 23 is provided with a rim 26 which is reflective on the inside. The light originating from the heating light source 21 then propagates inside the window 23 by means of e.g. total internal reflection between the two window surfaces, indicated as an example by the beam path 27, or the light may e.g. propagate directly through the window being reflected off the inside of the rim 28, as indicated by beam path 28. When the light from the heating light source 21 propagates inside the window 23, light is gradually absorbed in the window 21. Some of the absorbed light is dissipated as heat in the window 23. By the total internal reflection and the reflection at the rim the light entering the window 23 will eventually have travelled a long effective path before being extinct due to absorption, thus ensuring an effective transformation of optical energy in the light into heat in the window. By using an optical fiber the light source 21, that requires some sort of electrical power, can be physically separated from the window 23. Thus, the heating and defogging/deicing of the window 23 can be provided in a place where electrical power is unavailable or unsuitable, e.g. on top of the nacelle of a wind turbine.

The invention claimed is:

1. A LIDAR system comprising:
   a beam generating section adapted for generating a substantially linearly polarized output beam, and
   a beam steering section comprising a first optical device for controllably altering the polarization of the output beam, said first optical device in optical connection with a first polarizing beam splitter, said beam steering section adapted for directing the output beam interchangeably between a first and a second direction,
   wherein the LIDAR system is configured for detecting, propagating and/or receiving radiation received from said first and second directions and wherein said received radiation is propagating in the opposite direction of the output beam.

2. The LIDAR system according to claim 1, wherein the beam generating section further comprises a non-reciprocal optical element where through the output beam and the received radiation can propagate in opposite directions, said non-reciprocal optical element adapted for rotating the polarization of the output beam and of the received radiation.

3. The LIDAR system according to claim 2, wherein said non-reciprocal optical element is configured such that the polarization of the output beam and the polarization of the received radiation are substantially perpendicular to each other on one side of the non-reciprocal optical element and substantially parallel to each other on the opposite side of the non-reciprocal optical element.

4. The LIDAR system according to claim 2, wherein the non-reciprocal optical element is adapted to rotate the polarization of the output beam by approx. 45 degrees when the output beam propagates through said non-reciprocal optical element.

5. The LIDAR system according to claim 2, wherein the non-reciprocal optical element is adapted to rotate the polarization of the received radiation by approx. 45 degrees when the received radiation propagates through said non-reciprocal optical element.

6. The LIDAR system according to claim 2, wherein the non-reciprocal optical element rotates the polarization of the light by means of the Faraday effect or by means of a Faraday rotator.

7. The LIDAR system according to claim 1, wherein the beam steering section further comprises a second optical device for controllably altering the polarization of the output beam propagating in the second direction, said second optical device in optical connection with a second polarizing beam splitter, said beam steering section adapted for directing the output beam interchangeably between the first direction, the second direction and a third direction.

8. The LIDAR system according to claim 1, wherein the first optical device and/or the second optical device can function as a reciprocal optical element.

9. The LIDAR system according to claim 1, wherein the beam steering section is adapted for directing the output beam towards a measurement volume for illumination of particles in the measurement volume.

10. The LIDAR system according to claim 1, further comprising means for generating a reference beam.

11. The LIDAR system according to claim 10, wherein the reference beam is propagating in the opposite direction of the output beam.

12. The LIDAR system according to claim 1, adapted for detecting, propagating and/or receiving radiation received from said first, second and/or third direction.

13. The LIDAR system according to claim 1, wherein the first and/or the second optical device is a variable optical retarder.

14. The LIDAR system according to claim 1, wherein the first and/or the second optical device is a rotatable wave plate.

15. The LIDAR system according to claim 1, wherein the first and/or the second optical device is adapted for controllably altering the polarization of the output beam without moving parts.

16. The LIDAR system according to claim 1, wherein the first and/or the second optical device is adapted for controllably altering the polarization of the output beam between two specific states of polarization.

17. The LIDAR system according to claim1, wherein the first and/or the second optical device is adapted for controllably altering the polarization of the output beam between two specific states of polarization with a predefined frequency.

18. A LIDAR system comprising:
    a beam generating section adapted for generating a substantially linearly polarized output beam, and
    a polarization maintaining optical waveguide for propagating the
    output beam in a first direction and received radiation in a second and opposite direction, and
    a non-reciprocal optical element where through the output beam and the received radiation propagate in opposite directions, said non-reciprocal optical element adapted for rotating the polarization of the output beam and of the received radiation.

19. The LIDAR system according to claim 18, wherein said optical element is configured such that the polarization of the output beam and the polarization of the received radiation are substantially perpendicular to each other on one side of the optical element and substantially parallel to each other on the opposite side of the optical element.

20. A LIDAR system according to claim 1, further comprising a wind turbine.

21. A LIDAR system according to claim 18, further comprising a wind turbine.

22. A LIDAR system according to claim 1, further comprising a sailboat.

23. A LIDAR system according to claim 1, further comprising an airplane.

24. A LIDAR system according to claim 18, further comprising a sailboat.

25. A LIDAR system according to claim 18, further comprising an airplane.

* * * * *